United States Patent [19]

Takei

[11] 4,428,569

[45] Jan. 31, 1984

[54] ENGINE MOUNTING FOR AUTOMOBILE

[75] Inventor: Hirofumi Takei, Yokosuka, Japan

[73] Assignee: Nissan Motor Co., Ltd., Yokohama, Japan

[21] Appl. No.: 278,400

[22] Filed: Jun. 29, 1981

[30] Foreign Application Priority Data

Jul. 22, 1980 [JP] Japan ................................ 55-100170

[51] Int. Cl.³ ........................ F16M 1/00; F16M 13/00
[52] U.S. Cl. ................................ 267/140.1; 267/8 D;
248/562; 248/636
[58] Field of Search ............... 137/498, 503, 504, 517;
188/282, 317, 322.15, 379, 280, 275; 248/562,
631, 636; 267/140.1, 141.1, 141.2, 141.3, 41.4,
141.5, 127, 8 D, 113

[56] References Cited

U.S. PATENT DOCUMENTS

| 1,460,723 | 7/1923 | Lovejoy . | |
|---|---|---|---|
| 1,540,341 | 6/1925 | Kirby | 188/280 |
| 2,149,863 | 3/1939 | Olley . | |
| 2,252,771 | 8/1941 | Katcmer | 188/280 |
| 2,644,482 | 7/1953 | McCallum | 137/504 |
| 2,976,962 | 4/1956 | Pegard . | |
| 3,137,466 | 6/1964 | Rasmussen | 248/562 |
| 3,663,002 | 5/1972 | Gergle et al. | 267/8 D |
| 3,896,908 | 7/1975 | Petrak | 188/280 |
| 4,159,091 | 6/1979 | Le Salver et al. | 248/562 |

FOREIGN PATENT DOCUMENTS

| 15378 | 9/1980 | European Pat. Off. . | |
|---|---|---|---|
| 2426326 | 12/1974 | Fed. Rep. of Germany | 188/280 |
| 2947018 | 5/1981 | Fed. Rep. of Germany . | |
| 642711 | 9/1928 | France | 188/298 |
| 2435632 | 4/1980 | France . | |
| 470545 | 8/1937 | United Kingdom . | |
| 2041185 | 10/1980 | United Kingdom | 267/140.1 |

Primary Examiner—Bruce H. Stoner, Jr.
Assistant Examiner—Robert J. Oberleitner
Attorney, Agent, or Firm—Schwartz, Jeffery, Schwaab, Mack, Blumenthal & Koch

[57] ABSTRACT

An engine mounting has a first armature, a second armature, a bellows interposed between the first and second armatures, and an inertia mass. The inertia mass is mounted on the bellows and vibrates independently with the first and second armatures. A partition wall formed with a passageway is disposed within the interior of the bellows and divides same into two chambers. A valve is mounted on the partition wall to open or close the passageway. The valve is responsive to a difference in pressure between the two chambers and decreases the effective area of the passageway during vibrations of the bellows with large amplitudes.

6 Claims, 2 Drawing Figures

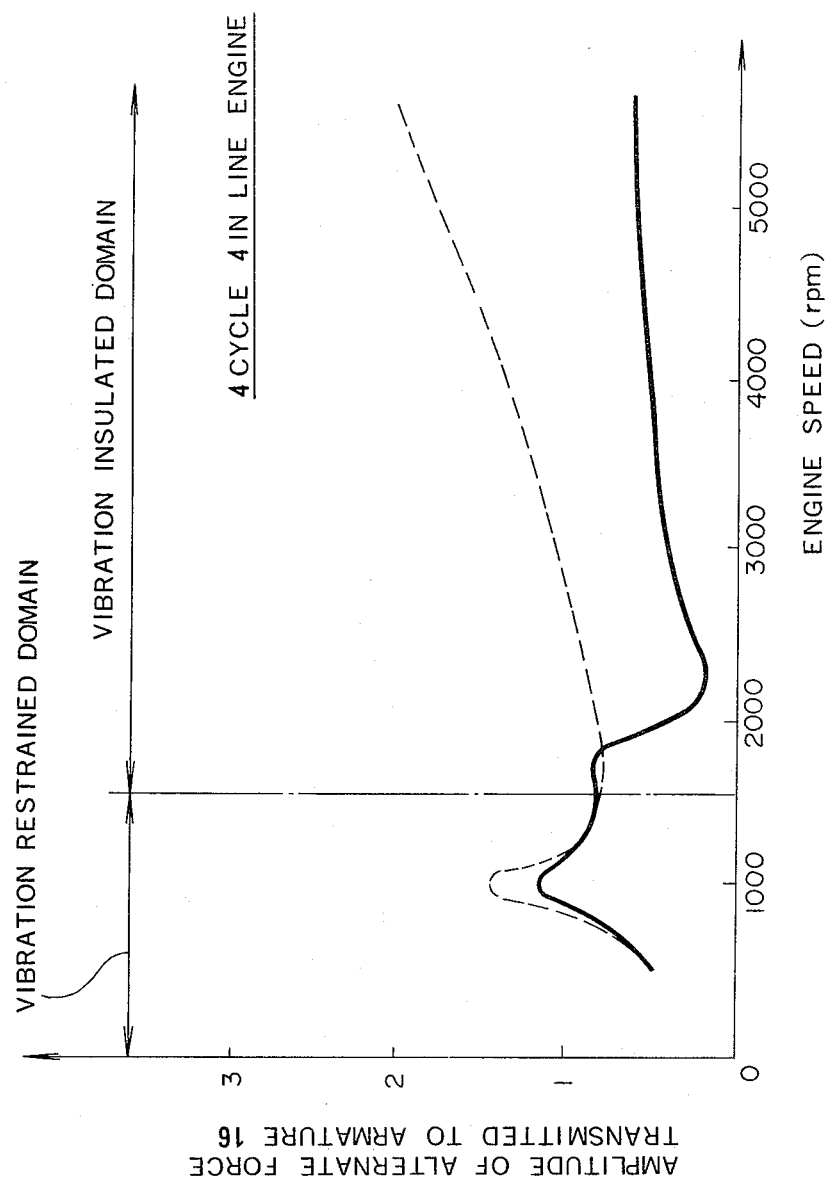

ENGINE MOUNTING FOR AUTOMOBILE

BACKGROUND OF THE INVENTION

1. Field of the Invention

The present invention relates to an engine mounting for suspending an engine relative to a vehicle structure.

2. Description of the Prior Art

In an automotive vehicle, the elastic block structures employed for the suspension of an engine relative to the vehicle structure have a principal function to restrain low frequency vibrations falling within a vibration restrained domain. In this respect, the block structures must have a high dynamic spring constant (high stiffness) suitable for restraining such vibrations. Unfortunately, this high stiffness suitable for restraining such low frequency vibrations results in a considerable impairement of the comfort under the effect of high frequency vibrations having frequencies falling within a vibration insulated domain.

The conventional elastic block structures are set to exhibit a characteristic as represented by a broken line curve a shown in FIG. 2. With the conventional engine mounting employing the elastic blocks, since the dynamic spring constant of the elastic blocks is set high enough to restrain or attenuate low frequency vibrations (between 5 and 30 Hz) produced by the uneveness of a road surface of the road or coming from the engine upon its idling operation, the high frequency vibrations (above 30 Hz) due to engine operation above the idle speed are not insulated or filtered satisfactorily. On the other hand, if the dynamic spring constant is set high enough to insulate or filter the high frequency vibrations having frequencies above 30 Hz, the low frequency vibrations are not restrained or attenuated satisfactorily. Therefore, the elastic block structures cannot meet both requirements, that is, restraining the low frequency vibrations within the vibration restrained domain and insulating the high frequency vibrations within the vibration insulated domain.

SUMMARY OF THE INVENTION

According to the present invention, an engine mounting for suspending an engine relative to a vehicle structure is provided which comprises: a first armature for connection to the engine and a second armature for connection to a vehicle structure and a bellows interposed between the two armatures and defining therewith a closed enclosure, the closed enclosure being filled with pressurized gas, and an inertia mass mounted on the bellows. Partition means is attached to the inertia mass for unitary motion therewith for dividing the interior of said closed enclosure into a first chamber and a second chamber and defining passage means which allows communication between said first chamber and said second chamber. Effective area varying means is provided for decreasing the effective area of said passage means during oscillation of the bellows with relatively large amplitude and for increasing the effective area of said passage means during oscillation of the bellows with relatively small amplitudes.

Accordingly, an object of the present invention is to provide an engine mounting which can meet the above-mentioned conflicting requirements.

BRIEF DESCRIPTION OF THE DRAWINGS

The features and advantages of the engine mounting according to the present invention will be more clearly appreciated from the following description taken in conjunction with the accompanying drawing in which:

FIG. 2 is a graph showing a relationship between amplitude of alternate force transmitted to vehicle structure vs. engine speed.

DETAILED DESCRIPTION OF THE INVENTION

Figure 1:
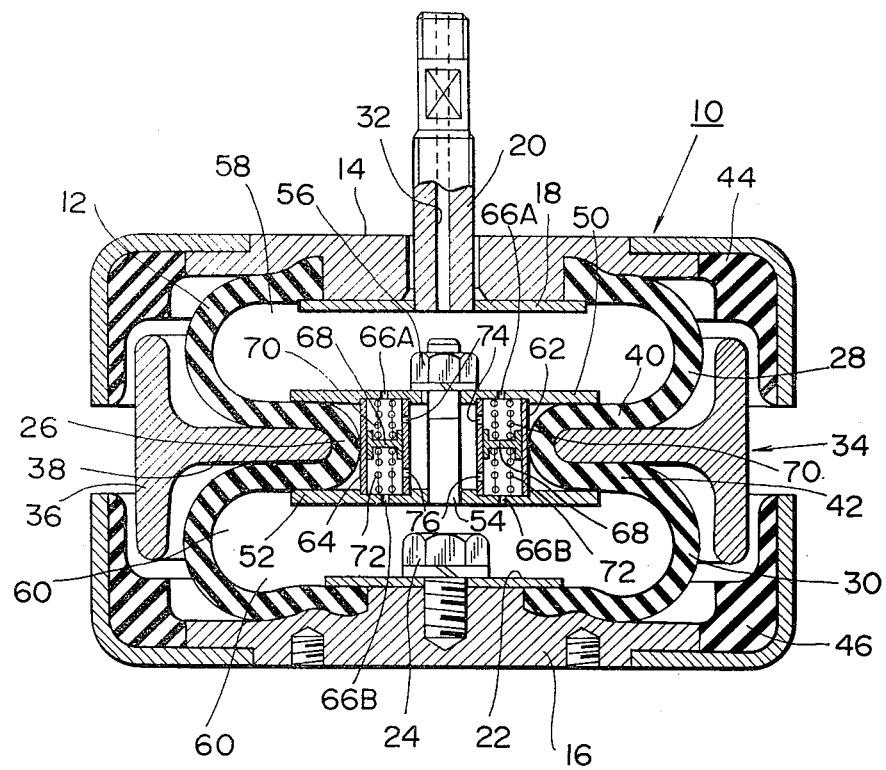
FIG. 1 is a sectional view of an embodiment of an engine mounting according to the present invention.

Referring to FIG. 1, an engine mounting according to the present invention is generally denoted by the reference numeral 10 which generally comprises an elastic bellows 12 interposed between a first or upper armature 14 for connection to an engine, a second or lower armature 16 for connection to a vehicle structure, that is, a vehicle body in this embodiment. The elastic bellows has an upper end clamped between the armature 14 and a retainer plate 18 which is pressed against the armature 14 by a stud bolt 20 threadedly engaged with the armature 14 to extend therethrough. The lower end of the bellows 12 is clamped between the armature 16 and a retainer plate 22 which is pressed against the armature 16 by a stud bolt 24 threadedly engaged with the armature 16. Therefore, the bellows 12 interposed between the two armatures 14 and 16 defines therewith a closed enclosure. The bellows has a waist portion 26 between an upper radially extending hinge 28 and a lower radially extending hinge 30. The stud bolt 20 is formed with an air supply passage 32 through which air is fed into the interior of the bellows 12 under pressure, so that the bellows 12 acts as an air spring.

An inertia mass 34 is mounted on the bellows 12. The inertia mass 34 has a ring portion 36 having a radially inwardly extending portion 38 fitted around the waist portion 26 in a manner to be clamped between the opposing wall portions 40 and 42 of the bellows 12 so that the mass of the inertia mass 34 is imparted to the waist portion 26 of the bellows 12.

Air pressure within the bellows 12 and the mass of the inertia mass 34 are appropriately chosen such that in respect of vibrations within a vibration insulated domain coming from the engine upon its operation above an idle speed, the phase of vibrations of the inertia mass 34 is in inverse relationship with the phase of vibrations of the armature 14 connected to the engine. In order to prevent excessively great amplitude of displacement of the inertia mass 34, an annular stop rubber 44 is attached to the peripheral portion of the armature 14 and a similar annular stop rubber 46 is attached to the outer peripheral portion 46 of the armature 16.

Designated by the reference numerals 50 and 52 are a pair of partition plates which are attached via the wall portions 40 and 42 of the bellows 12 defining the waist portion 26 to the radially inwardly extending portion 38 of the inertia mass 34. A bolt 54 is fixedly attached to the center of the lower partition plate 52, and, with a nut 56 threadedly engaged with this bolt 54, the pair of partition plates 50 and 52 clamp therebetween the radially inwardly extending portion 38 of the inertia mass 34. The pair of partition plates 50 and 52 divide the interior of the bellows 12 and define on one side thereof an upper chamber 58 and on the other side thereof a lower chamber 60. Two cylinders 62 and 64 are fixedly mounted between the pair of partition plates 50 and 52 and have both ends of each cylinder 62 or 64 closed by the pair of partition plates 50 and 52. The pair of partition plates 50 and 52 are formed with orifices 66A and 66B opening respectively into the ends of the cylinders 62 and 64 to allow communication between the interior of each cylinder and the upper chamber 58 and the lower chamber 60. Spool valves 68 are axially slidable within the cylinders 62 and 64, respectively. Designated by 70 and 72 are coil springs interposed between the spool valves 68 and the partition plates 50 and 52 to bias the spool valves in the opposite directions. With these spool valves 68, the bore of each of the cylinders 62 and 64 is divided into upper and lower chambers, and the circumferential wall portion of each of the cylinders 62 and 64 is formed with a side orifice 74 opening into the upper chamber of each cylinder and another side orifice 76 opening into the lower chamber of each cylinder. Communication between the upper chamber 58 and lower chamber 60 is established via the end orifice 66A, side orifice 74, side orifice 76 and end orifice 66B so that the orifices 66A, 74, 76 and 66B restrict the flow communication to act as a damper upon contraction and expansion of the bellows 12, thus performing vibration damping function.

The operation is explained hereinafter making a reference to a characteristic curve b shown in FIG. 2.

During operation within a low frequency vibration domain or vibration restrained domain where the vibrations coming from the unevenness of a road surface have frequencies ranging from 5 to 30 Hz, the above-mentioned bellows 12 oscillates with relatively large amplitudes. This causes the internal pressure change within the rubber bellows 12 constituting the air spring to increase, resulting in an increase in change in pressure within the bore of each of the cylinders 62 and 64, thus causing the spool valves 68 within the bore of the cylinders 62 and 64 to reciprocate upwardly and downwardly with relatively large amplitudes. As a result, since the spool valves 68 cover or close the side orifices 74 and 76 during most of their operation time, thus decreasing the effective areas of the orifices 74 and 76. As a result, the dynamic spring constant of the air spring as a whole is increased, thus effectively preventing the engine from bouncing owing to the relatively large amplitude vibrations coming from the unevenness of the road surface.

During operation within a high frequency vibration domain or vibration insulated domain where the vibrations have frequencies above or higher than 30 Hz and with relatively small amplitudes, the change in pressure within the bellows 12 causes the spool valves 68 within each of the cylinders 62 and 64 to reciprocate with small amplitudes and at relatively high frequencies. This causes the spool valves 68 to stay in neutral positions, thus leaving the side orifices 74 and 76 uncovered. Therefore, under this condition, the air spring acts to create a damping force in a direction opposite to the direction of the displacement of the engine, and this in cooperation with the effect of the inertia mass 34 which moves in inverse phase relationship with the displacement of the engine greatly descreases the dynamic spring constant, thus effectively reducing the transmission of alternate force from the engine to the vehicle body or structure.

As having been described, according to the present invention, the bellows 12 is constructed to have two radially extending hinges 28 and 30, the inertia mass 34 forming an additional mass is retained between two radially extending hinges, the interior of the bellows 12 is divided into two chambers 58 and 60 at the portion where the inertia mass 34 is attached thereto, passages (66A, 74, 76, 66B) communicating the chamber 58 with the chamber 60 decrease their effective areas during vibrations with relatively large amplitudes, and increase their effective areas during vibrations with small amplitudes, thus considerably improving the vibration restraining performance of the engine and vibration insulating performance of the engine, particularly the vibration insulation performance is enhanced to decrease the transmission of alternate force from the engine to the vehicle body, resulting in a considerable reduction in vehicle interior noise.

What is claimed is:

1. An engine mounting for suspending an engine relative to a vehicle structure, comprising:
a first armature for connection to the engine and a second armature for connection to the vehicle structure;
an elastic bellows interposed between said first and second armatures and defining therewith a closed enclosure;
an inertia mass mounted on said bellows to be movable with a part of said bellows and resiliently held between said first and second armatures to vibrate independently of said first and second armatures;
said closed enclosure being filled with pressurized gas;
a partition wall disposed within said closed enclosure and fixedly attached to said inertia mass for unitary motion therewith, said partition wall dividing the interior of said closed enclosure into a first chamber and a second chamber and defining passage means for allowing flow communication between said first chamber and said second chamber; and
effective area varying means for varying the effective area of said passage means in response to a difference between pressure in said first chamber and that in said second chamber, said effective area varying means decreasing the effective area of said passage means during oscillation of said bellows with amplitudes larger than a predetermined amplitude and for increasing the effective area of said passage means during oscillation of said bellows with amplitudes smaller than said predetermined amplitude.

2. An engine mounting as claimed in claim 1, wherein said effective area varying means comprises a spool valve.

3. An engine mounting as claimed in claim 1, wherein said partition wall includes:
a pair of partition plates disposed within said closed enclosure and fixedly attached to said inertia mass for unitary motion therewith, said pair of partition plates defining said first chamber on one side thereof and a second chamber on the other side thereof;
a plurality of cylinders, each fixedly mounted between said pair of partition plates and having both ends closed by said pair of partition plates, each of said pair of partition plates being formed with orifices communicating with said plurality of cylinders, respectively; and
wherein said effective area varying means includes
a plurality of spool valves axially slidable within said plurality of cylinders, respectively;
a plurality of first coil springs biasing said spool valves in a first direction;
a plurality of second coil springs biasing said spool valves in a second direction which is opposite to the first direction; and each of said plurality of cylinders being formed with a first side orifice within an area between said valve spool and said one of said pair of partition plates and with a second side orifice within an area between said valve spool and said other of said pair of partition plates, said first and second side orifices being adapted to be covered by said valve spool.

4. In a vehicle:

an engine;

a vehicle structure;

a first armature securely connected to said engine for movement therewith;

a second armature securely connected to said vehicle structure for movement therewith;

an elastic bellows having one end securely connected to said first armature and an opposite end securely connected to said second armature and defining therewith a closed enclosure;

said elastic bellows having a waist portion, a first hinge portion radially extending from said one end thereof and said waist portion, and a second hinge portion radially extending from said opposite end thereof and said waist portion thereof;

an inertia mass having a ring section and a radially inwardly extending section fitted and received in said waist portion of said bellows;

a gas contained in said closed enclosure under pressure;

a partition wall disposed within said closed enclosure and dividing said closed enclosure into a first chamber and a second chamber, said partition wall having a pair of partition plates clamping therebetween said waist portion of said bellows and said radially inwardly extending section of said inertia mass for unitary motion of said partition plates, said waist portion and said inertia mass, said partition wall including at least one cylinder fixedly mounted between said pair of partition plates and having both ends closed by said pair of partition plates, each of said pair of partition plates being formed with an orifice communicating with said cylinder;

a spool valve slidably disposed within said cylinder for axial reciprocal movement therein in response to a difference between pressure in said first chamber and that in said second chamber;

a first spring disposed between one of said pair of partition plates and said spool valve and biasing said spool valve in first direction;

a second spring disposed between the other of said pair of partition plates and said spool valve and biasing said spool valve in a second direction opposite to said first direction;

said cylinder being formed with a first side orifice within an area between said valve spool and said one of said pair of partition plates and with a second side orifice within an area between said valve spool and said other of said pair of partition plates;

said spool valve being reciprocally movable to cover said first and second orifices alternatively to decrease the effective areas of the first and second orifices when said elastic bellows oscillates upon said first armature and said second armature being subject to vibrations having frequencies lower than a predetermined frequency, thus decreasing flow of communication via said orifice formed in said one of said pair of partition plates, said first side orifice, said second side orifice and said orifice of said other of said pair of partition plates, said valve spool staying in a neutral position thereof leaving said first and second side orifices uncovered when said elastic bellow oscillates upon said first and second armature being subject to vibrations having frequencies higher than said predetermined frequency.

5. A vehicle as claimed in claim 4, wherein said gas pressure within said elastic bellows and the mass of said inertia mass are selected such that said inertia mass vibrates in the same phase as the phase of vibration of said first armature when said first and second armatures are subject to vibrations having frequencies lower than said predetermined frequency, whereas said inertia mass vibrates in inverse phase relationship with the phase of vibration of said first armature when said first and second armatures are subject to vibrations higher than said predetermined frequency.

6. A vehicle as claimed in claim 5, wherein each of said first and second armatures has an annular rubber stop attached thereto which abuts with said ring section of said inertia mass to limit excessive displacement of said inertia mass.

* * * * *